US 8,583,181 B2

(12) United States Patent
Johnstone et al.

(10) Patent No.: US 8,583,181 B2
(45) Date of Patent: Nov. 12, 2013

(54) MANAGEMENT OF UNAUTHORIZED USER EQUIPMENTS IN A FEMTO BASE STATION ENVIRONMENT

(75) Inventors: Justin Johnstone, Swindon (GB); Andrea Giustina, Milan (IT); Peter Keevill, Bath (GB); Richard Byrne, Berkshire (GB)

(73) Assignee: Ubiquisys Limited, Swindon (GB)

( * ) Notice: Subject to any disclaimer, the term of this patent is extended or adjusted under 35 U.S.C. 154(b) by 945 days.

(21) Appl. No.: 11/827,099

(22) Filed: Jul. 9, 2007

(65) Prior Publication Data

US 2008/0305835 A1 Dec. 11, 2008

(30) Foreign Application Priority Data

Jun. 6, 2007 (GB) .................................. 0710875.6

(51) Int. Cl.
*H04M 1/00* (2006.01)

(52) U.S. Cl.
USPC ............... 455/561; 455/456.6; 455/456.1; 455/456.5; 455/524; 455/525; 370/343

(58) Field of Classification Search
USPC ................................ 455/561, 456.6; 370/343
See application file for complete search history.

(56) References Cited

U.S. PATENT DOCUMENTS

| 6,356,755 | B1 * | 3/2002 | Valentine et al. ........... 455/435.1 |
| 2003/0045270 | A1 * | 3/2003 | Agrawal et al. ............... 455/410 |
| 2007/0097939 | A1 | 5/2007 | Nylander et al. |
| 2007/0183427 | A1 * | 8/2007 | Nylander et al. ........... 370/395.2 |
| 2007/0254620 | A1 * | 11/2007 | Lindqvist et al. ............. 455/403 |
| 2008/0057939 | A1 | 3/2008 | Choi-Grogan |
| 2008/0081636 | A1 * | 4/2008 | Nylander et al. ........... 455/452.2 |
| 2008/0188265 | A1 * | 8/2008 | Carter et al. .................. 455/561 |
| 2010/0075658 | A1 * | 3/2010 | Hou et al. .................. 455/422.1 |

FOREIGN PATENT DOCUMENTS

| EP | 1492374 A | 12/2004 |
| EP | 1 773 083 A1 | 4/2007 |
| GB | 2315193 A | 1/1998 |
| WO | WO98/37721 | 8/1998 |
| WO | WO 2007/015068 A1 | 2/2007 |
| WO | WO2007/040449 | 4/2007 |

OTHER PUBLICATIONS

International Search Report and Written Opinion, dated Oct. 6, 2009, issued in corresponding International Application No. PCT/GB2008/001962.
In-Hye Shin and Gyung-Leen Park, "On Employing Hierarchical Structure in PCS Networks," Lecture Notes in Computer Science, Springer Verlag, Berlin, vol. 2668 (Jan. 1, 2003), pp. 155-162, XP007909871 ISSN: 0302-9743.
United Kingdom Search Report dated Aug. 7, 2008 for related GB Application No. 0710875.6.

(Continued)

*Primary Examiner* — Kamran Afshar
*Assistant Examiner* — Shahriar Behnamian
(74) *Attorney, Agent, or Firm* — Weaver Austin Villeneuve & Sampson LLP

(57) ABSTRACT

A method of managing registration requests from unauthorized user equipments in a cellular communications network includes monitoring such further registration requests and maintaining a count of the total number of registration requests from said user equipment. Based on the counted number of unsuccessful registration requests, different mechanisms can be used to reject the registration request.

12 Claims, 3 Drawing Sheets

(56) References Cited

OTHER PUBLICATIONS

United Kingdom Search Report dated Aug. 6, 2008 for related GB Application No. 0710875.6.
Partial International Search Report issued in corresponding International Application No. PCT/GB2008/001962.
"Unlicensed Mobile Access (UMA); Protocols (Stage 3)" R1.0.4, XP002394549, May 2, 2005.
United Kingdom Search Report dated Sep. 24, 2007, for related GB Application No. 0710875.6. 1 page.
Japanese Office Action dated Mar. 23, 2012, JP Application No. 2010-510879.
GB Examination Report dated Jun. 27, 2011, GB Application No. GB0710875.6.
European Second Office Action dated May 23, 2012, Applicatiopn No. 08 762 303.9-2413.
CN Office Action dated Apr. 15, 2013 for CN Application No. 200880102247.7.
China Office Action dated Jun. 5, 2012, Application No. 200880102247.7.

* cited by examiner

| Femtocell Response | Femtocell Category (RF environment + Detection/Recovery Phase) | | | | | | |
|---|---|---|---|---|---|---|---|
| Action Type | Home / Business -no/poor Macro- | | Home / Business -with Macro- | | Public | TroubleSpot | |
| | Phase 1 | Phase 2 | Phase 1 | Phase 2 | Phase 1 & 2 | Phase 1 & 2 | |
| 1. Reject request using cause "retry upon entry to new cell" | Configurable (Enabled) | Disallowed | Configurable (Enabled) | Disallowed | | Disallowed | |
| 2. Accept request & provide emergency access only | Disallowed | Configurable (Disabled) | Disallowed | Configurable (Disabled) | Disallowed | Disallowed | |
| 3. Reject request using cause #12, 13, 15 – resulting in "Forbidden LAI" | Disallowed | Configurable (Enabled) | Disallowed | Disallowed | | Configurable (Enabled) | |
| 4. Reject RRC connection request | Configurable (Enabled) | | | | | Configurable (Enabled) | |

Figure 2

MANAGEMENT OF UNAUTHORIZED USER EQUIPMENTS IN A FEMTO BASE STATION ENVIRONMENT

This invention relates to a basestation for a cellular communications system, and in particular to a method of preventing registration problems within that cellular communications system.

BACKGROUND

In recent times, the use of femtocell basestations has been proposed, for use in cellular communications networks. Such femtocell basestations may typically be purchased by a user for use in an office or home, where they can be connected to a core network through the internet. Thereafter, the femtocell basestations act as regular basestations within the cellular network, and provide service for mobile phones (UEs) within that office or home.

Femtocells typically have a restricted number of dedicated (pre-provisioned) users to which they individually provide service. Local Access Control procedures in the femtocell restrict service to only those users that are provisioned/authorised on that femtocell.

Mobiles (referred to as UEs henceforth) are able to discern whether they can access any cell based on PLMN codes (from their home PLMN or other permitted/equivalent PLMN). However, for cells within the allowed PLMN code(s), UEs are typically unable to ascertain which femtocells they will or will not be granted service on. Therefore UEs will typically attempt to register for service on any otherwise suitable femtocell.

The "Home" femtocell(s) (defined as one or more cells where that UE is specifically provisioned for service) will accept the registration and provide service. However any "visited" femtocell (defined as any cell where the UE is not provisioned for service) will reject the registration attempt.

This restricted number of authorized users leads to many problems that are not typically encountered with conventional basestations within the cellular network.

STATEMENT OF INVENTION

According to the present invention, there is provided a method of managing user equipments in a cellular communications network, the method comprising:
at a basestation, receiving a registration request from a user equipment which is unauthorized on said basestation;
monitoring for further registration requests from said user equipment; and
maintaining a first count of the total number of registration requests from said user equipment.

This has the advantage that the counted number of registration requests can be used to determine a mechanism for rejecting further registration requests, in a manner that reduces negative impacts on the user equipment and on the network.

BRIEF DESCRIPTION OF THE DRAWINGS

For a better understanding of the present invention, and to show more clearly how it may be carried into effect, reference will now be made, by way of example, to the following drawings, in which:

FIG. 2 illustrates an aspect of the system in accordance with the invention.

DETAILED DESCRIPTION OF THE PREFERRED EMBODIMENTS

Figure 1:
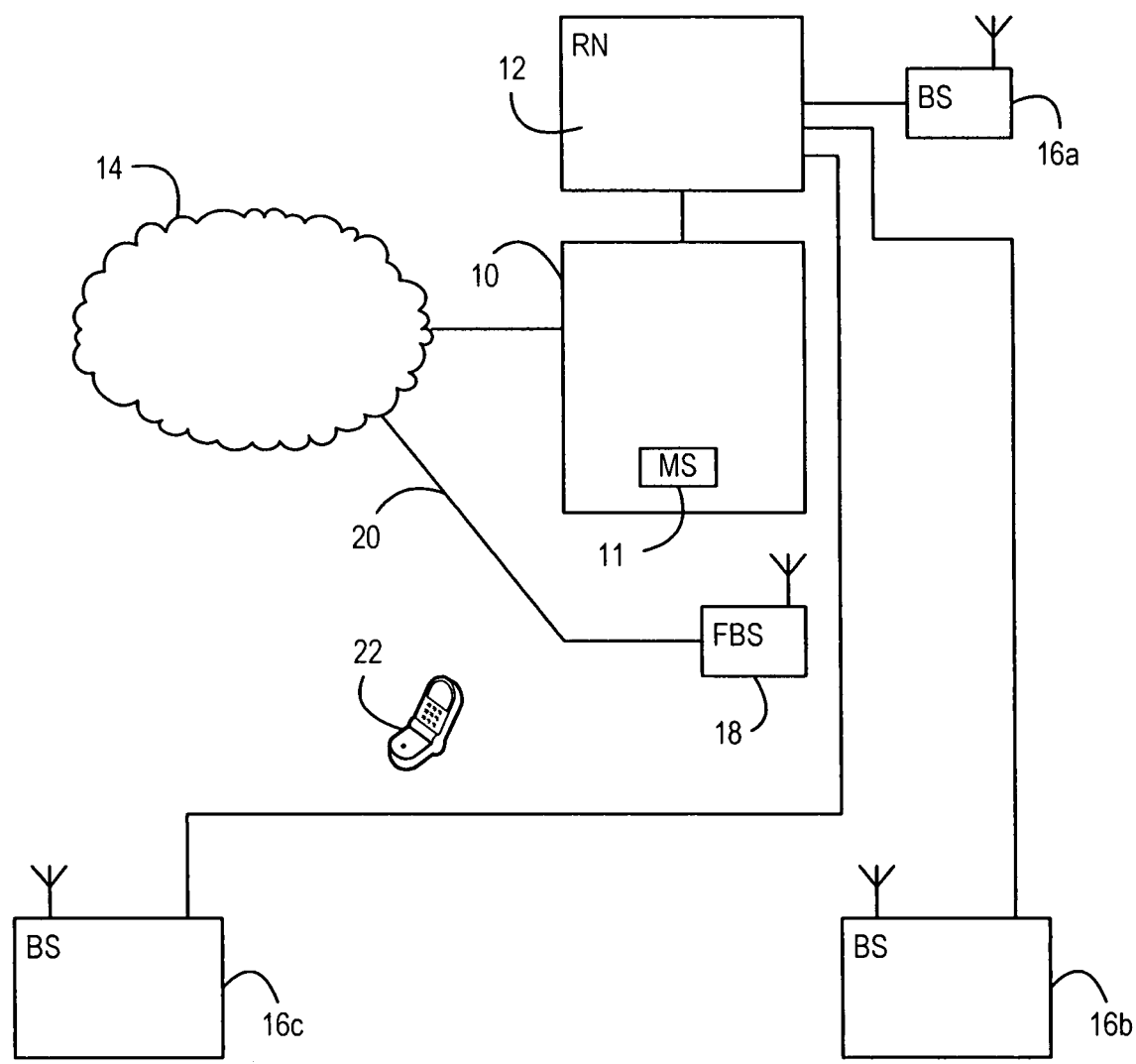
FIG. 1 is a block schematic diagram, illustrating a part of a cellular wireless communications network in accordance with an aspect of the present invention.

FIG. 1 illustrates a part of a cellular wireless communications network in accordance with an aspect of the present invention. Specifically, FIG. 1 shows a core network (CN) 10 and a radio network (RN) 12 of a cellular wireless communications network. These are generally conventional, and are illustrated and described herein only to the limited extent necessary for an understanding of the present invention.

Thus, the core network 10 has connections into the Public Switched Telephone Network (PSTN) (not shown) and into a packet data network, for example the internet 14. The radio network 12 may include, for example, a GSM radio network and/or a UMTS radio network, which are then generally conventional. As shown in FIG. 1, the radio network 12 has a number of basestations (BS) 16a, 16b, 16c connected thereto.

As will be recognized by the person skilled in the art, a typical radio network 12 will have many such basestations connected thereto. These basestations provide coverage over respective geographic areas, or cells, such that a service is available to subscribers. Often, there is a group of basestations that together provide coverage to the whole of the intended service area, while other basestations provide additional coverage to smaller areas within that intended service area, in particular to smaller areas where there is expected to be more demand for the service. The cells served by the basestations of the first group are then referred to as macrocells, while the smaller areas served by the additional basestations are referred to as femtocells.

FIG. 1 also shows an additional basestation 18 that can be used to provide coverage over a very small area, for example within a single home or office building. This is referred to as a femtocell basestation (FBS). The femtocell basestation 18 is available for purchase by a customer from a general retail outlet and, after purchase, can be connected into the mobile network operator's core network 10 over the internet 14, by means of the customer's existing broadband internet connection 20. Thus, a user of a conventional mobile phone 22 can establish a connection through the femtocell basestation 18 with another device, in the same way that any other mobile phone can establish a connection through one of the other basestations of the mobile network operator's network, such as the basestations 16a, 16b, 16c.

As shown in FIG. 1, the core network 10 includes a management system (MS) 11, which is provided specifically for managing the femtocell basestation 18 and the other femtocell basestations that are active in the network.

As mentioned above, the macrocell basestations provide coverage to the whole of the intended service area including the location of the femtocell basestation 18 and the location of the mobile phone 22 while it is in the coverage area of the femtocell basestation 18.

Where the femtocell basestation forms part of a UMTS network, a visited femtocell has numerous options (e.g. using certain "reject causes") defined in the 3GPP standard on how to reject unauthorized UEs. Depending on the reject response, the following two undesired consequences of rejection may occur:

"Registration Reject Loop": Where a rejected UE may back off for a defined period and then repeat the registration attempt again. Since the visited cell will again reject the request (if using the same/similar reject response), the UE may enter into a continual cycle or "rejection loop" (registration request>reject>request>reject> . . . etc). In the UE, such a cycle will cause undesirably fast battery drain. In the femtocell basestation, a rejection loop will cause undesirable signal loading, diverting resources away from authorized users. This in turn may lead to increased delays and capacity and performance restrictions.

"Home Lock-out": In order to prevent further failed registration attempts in a rejection loop, described above, a basestation may bar a UE from subsequent access to the femtocell by placing the location area code (LAC) of that femtocell into a "forbidden" list for the UE. The UE will then be blocked from accessing any other femtocell that happens to share the same LAC. This can lead to an undesired "lock-out" situation on the UE's home femtocell(s) if they happen to have the same LAC that has just been forbidden. When roaming back to the home cell(s) the UE will not even attempt to request service.

The likelihood of undesired "home lock-out" is inversely proportional to the size of the range of LAC codes used in the femtocell network. While a large LAC range, with each femtocell having a unique LAC code, is ideal, this is not possible since:

a) The maximum LAC range is finite (approx 65K values) according to 3GPP standards; and b) The network operator may have preferences/constraints in their core network which reduce this significantly further (e.g. perhaps to several thousand values only).

The present invention is therefore aimed at minimizing reject loops and home lock-out. As stated above, the number of LACs available to a femtocell basestation is finite. According to one aspect of the present invention, the allocation of LACs to femtocell basestations is managed to minimize the problem of home lock-out. On powering up, each femtocell basestation selects its LAC from a defined range of LACs. Allocating a relatively large range of LACs from which to choose a LAC value minimizes the chances of home lock-out, as re-use of LACs will be low. Allocating a small range of LACs increases the chances of home lock-out, as re-use will be high. The range of LACs allocated to the femtocell basestation may vary depending on a number of factors.

Within the management system 11, then, the available LACs are divided into groups, and each femtocell basestation selects its own LAC from the appropriate group. For example, each femtocell basestation may randomly select an LAC from the appropriate group, but may also continue to use the selected LAC only if no other nearby femtocell basestation is also using the same LAC. The femtocell basestation may learn of the LACs of neighbouring basestations for example by detecting the signals of those basestations directly, or through communications with the management system 11. In order to facilitate this latter technique, once the femtocell basestation has chosen its LAC, it then informs the management system 11 of the selected value. Neighbouring femtocells typically have different LACs in order that a roaming UE can detect when it has moved into the coverage of a different femtocell.

Each femtocell basestation may be categorized according to its intended use or deployment scenario. For example, a basestation in the "Home" category may have fewer authorized UEs, and so may require lower power levels than a basestation in the "Business" category. Further, a basestation in the "Public access" category is intended to be used by any passing UE, and therefore does not have a list of authorized users. A basestation may be in the "troublespot" category due to repeated failed access attempts by unauthorized users (for more details on this category, see below). Many different categories may be thought of by one skilled in the art. Defining the types of categories is essentially a task for the designer of the individual system, and the list of categories presented herein is not intended to be exhaustive or limiting on the scope of the invention in any way.

According to the present invention, public access femtocell basestations, for example, may be allocated a smaller range of the available LACs. A public access basestation is designed for use by any UE, and so will not reject a UE by placing its LAC on a forbidden list (or indeed may not reject a UE at all). Therefore, the problems of reject loop and home lock-out do not typically occur in public femtocells.

The network of femtocell basestations may be such that there are more business basestations than home basestations. In this scenario, the home basestations may be allocated fewer LACs to select from, in order to actively manage the limited number of LACs available.

"Troublespot" femtocell basestations may be allocated a high number of LACs, as it is likely that these basestations will reject UEs by forbidding the UE from accessing its LAC, potentially causing home lock-out. In a preferred embodiment, each basestation in the "troublespot" category may be allocated a unique LAC from a range of LACs set aside for that purpose, so that home lock-out will not occur. Thus, if a basestation in this category selects a particular LAC, the management system 11 must verify that no other basestation has selected the same LAC.

Further, each femtocell basestation may monitor the surrounding RF environment to detect the presence of neighbouring macrocell basestations. For example, if there is an adequate signal level from at least one macrocell basestation, or "macro signal", the problems of registration reject loop and home lock-out may occur less frequently: a UE which is rejected by the femtocell basestation may have a higher chance of success in registering with the surrounding macrocell basestation, and so may be less likely to repeatedly attempt registration with the femtocell. Conversely, if the macro signal is weak, reject loops are more likely to occur, as the UE has fewer options to choose from when attempting to access the network.

Therefore, according to the present invention, the femtocell basestation may also select its LAC from a group of LACs, with the choice of group being based on the surrounding macro signal. A relatively small range of LACs may be allocated to basestations that can detect an adequate macro signal, as the likelihood of reject loops (and therefore home lock-out) in this instance is low. A larger range of LACs may be allocated to femtocell basestations that can detect only a poor macro signal, or no macro signal at all, as the likelihood of reject loops (and therefore home lock-out) in this instance is high.

Further, the management system 11 may set a parameter within each femtocell basestation, setting the basis on which it can select its LAC. For example, the LAC may be selected whenever the device is powered up, and the parameter may allow the selection on a "fixed" basis, a "restore" basis, or a "random" basis.

Using the "fixed" basis, the management system 11 may in fact inform the femtocell basestation explicitly which LAC to select. Using the "restore" basis, the femtocell basestation may simply reselect the LAC that it was using before it was powered down, provided that this is not found to clash with the LAC of a neighbouring femtocell basestation. Using the "random" basis, the femtocell basestation may randomly select any LAC different from the LAC that it was using before it was powered down. By appropriate selection of the basis on which the LAC is to be selected, the risk of a home lock-out can be reduced still further.

As mentioned above, when a UE attempts to access a femtocell basestation on which it is not authorized, the basestation has a number of possible responses with which to reject the UE. The main rejection mechanisms are outlined below:

Reject Using Reject Causes #12, #13 or #15: "Location Area not Allowed"

This adds the location area identity (LAI) value into the UE's forbidden LAI list, and the UE will cease making further location registration attempts immediately. This incurs risk of "home lock-out" and may therefore be used selectively and in a controlled manner.

Reject Using Reject Cause: "Retry Upon Entry into a New Cell"

UEs will typically treat this as an abnormal rejection method and remain in the reject loop. However, in the future, it is anticipated that more UEs will actually adopt the intended action and cease making further location registration attempts.

Early RR Signalling Abort

Once the femtocell detects that an unprovisioned UE has entered a reject loop, the femtocell intentionally rejects subsequent RRC connection requests from that UE (unless for an emergency call). While the UE will remain in the reject loop, this has the benefit that the femtocell will not waste RRC resources on the unprovisioned UE.

Accept Registration but Limit Service to Emergency Calls Only

Once the femtocell detects that an unprovisioned UE has entered a reject loop, it will:
1. Accept the registration request.
2. Indicate this emergency service limitation to the user. There are numerous options to achieve this; however, an example of one method to achieve this is:
   a. Femtocell sends MM-INFORMATION messages to the UE after each Location Update procedure, using text string such as "Emergency Access Only" in the network name field of the MM-INFORMATION message.
   b. The UE displays this text on the screen (in place of the network name text).
3. The femtocell denies subsequent service requests from this unprovisioned UE for all except emergency calls.

Note: Since support of MM-INFORMATION messages by UEs is optional, this method cannot be relied upon for all UEs.

According to the present invention, to confirm the persistence of a UE in the reject loop and avoid taking unnecessary action for UEs that are transitory in the cell, the femtocell may be configured by the management system to detect and report the following threshold events.

When the femtocell receives the first location update request from an unprovisioned UE, it will commence a monitoring period (with duration configurable by the management system), where it counts subsequent registration attempts by that UE. If the count exceeds a first threshold (also configured by the management system) at the end of the monitoring period, the femtocell will provide a "reject loop indication" (containing that UE's identity) to the management system. If the count subsequently exceeds a second, higher, threshold, a further message is sent to the management system.

The femtocell basestation may also monitor in a general way for failed registration attempts. This extends the above monitoring and detection mechanism to identify the scenario where the combined effect of multiple transitory UEs in reject loops is also highlighted, even though any individual UE may not trigger a reject loop indication itself. Thus the basestation may keep a count of the total number of failed registration attempts from all UEs. This count is then compared to a "troublespot" threshold. The monitoring period and threshold count are configurable by the management system and, when this threshold is exceeded, the femtocell will provide a "troublespot indication" to the management system.

According to the present invention, the femtocell basestation may respond differently to a registration attempt by an unauthorized UE according to whether or not the first reject loop threshold, or the troublespot threshold, have been exceeded. That is, the femtocell may send a different one of the four rejection messages identified above according to whether the registration attempt is the first registration attempt by that UE, or the latest attempt in a reject loop.

According to another embodiment, the femtocell basestation may respond differently according to its category as identified above, e.g. "home", "business", "public", "troublespot", or any one of a number of different possibilities. For example, a "public" basestation may typically have all four possible rejection messages disallowed, as the intention is that it should provide service for any UE that requests it.

According to another embodiment, the femtocell basestation may respond differently according to the surrounding RF environment. That is, the basestation will monitor the "macro signal" to determine whether there is an adequate signal from neighbouring macrocell basestations. The femtocell basestation may then respond differently to an unauthorized UE in the presence of an adequate macro signal as compared to the absence of a macro signal. For example, as mentioned above, in the presence of an adequate macro signal reject loops are unlikely to occur. In this case, the reject message that places the LAI on the UE's forbidden list may be disallowed, preventing home lock-out.

FIG. 2 shows one possible configuration of rejection mechanisms. Thus, in the example illustrated in FIG. 2, there are three categories of basestation, namely home/business (with this category being subdivided based on whether or not the femtocell basestation can detect a signal from a macrocell basestation with an acceptable power level), public and troublespot basestations. For one or more of the categories, the rejection mechanism can also depend on whether the registration attempt in question is during the monitoring period (that is, during phase 1), or after the first threshold number of registration requests has been exceeded (that is, during phase 2).

The table shown in FIG. 2 also shows the status of four possible rejection mechanisms, namely the four rejection mechanisms described in more detail above, that is: rejecting the request using the cause "retry upon entry to new cell"; providing emergency access only; rejecting the request using a cause that results in a forbidden location area indicator (or code); and rejecting the RRC connection request.

Thus, for any given phase and category in the table, the status in each cell shows whether that mechanism is either:

Disallowed, meaning that the mechanism is never performed in that phase/category combination, and furthermore the system cannot be reconfigured to enable it; or Configurable, meaning that the mechanism may be enabled or disabled under dynamic control from the management system 11, either on a per FBS basis, or (more typically) set as a policy across the population of FBSs.

For each mechanism that is configurable, its default status (either enabled or disabled), is shown in parentheses in the table of FIG. 2. The default status is the standard, or recommended, status of any configurable mechanism, although it is permitted for a skilled operator, who understands and accepts the consequences, to alter the setting from the default.

Thus, each of these responses is chosen autonomously within the femtocell basestation itself, possibly within limits set by the system designers or by the mobile network operator, but with the intention that a single femtocell basestation design can allow different customized behaviours within different networks or at different locations. Thus, by responding to the UE without recourse to the management system, the basestation may reduce the workload of the management system and speed up the time required to resolve a problem.

However, as mentioned above, the basestation may also send an indication to the management system that a "troublespot" threshold has been exceeded, as a result of a large number of failed registration requests from one or more UEs. If a troublespot indication is sent, the management system may re-categorize the basestation into the "troublespot" category. In a preferred embodiment, the management system may only re-categorize the basestation after a certain number of troublespot indications have been received. In this way, the management system may avoid re-categorizing basestations on the basis of an isolated group of failed registration attempts.

When the management system has re-categorized a basestation into the "troublespot" category, different rejection mechanisms apply, as shown in FIG. 2.

Also, when the basestation sends a message to the management system indicating that the number of rejections of a particular mobile phone has exceeded a threshold, the management system may send an instruction to the basestation on how to respond to that specific mobile phone in the rejection loop state. On receipt of such an instruction, the FBS infers that phases 1 and 2 are concluded (for that specific mobile phone), and that therefore the rules in the table are no longer applicable to that mobile phone.

Thereafter, the basestation will follow diligently the instructions sent from the management system in respect of that specific mobile phone (without further reference to the 'rules' shown in the table of FIG. 2, it being noted that the action instructed by the management system may differ from the rules followed during phases 1 & 2).

For example, if a reject loop indication has been received by the management system, it may compare the LAC of the reporting femtocell with the LAC(s) of the rejected UE's home femtocell(s). If there is no duplication or overlap, the management system may instruct the femtocell to issue a reject cause #12, 13 or 15, i.e. putting the LAC on the forbidden list of the UE, as there is no danger of causing a home lock-out in that instance. By contrast, if there is an overlap between the LAC of the reporting femtocell and the home cell of the UE, the management system may prevent the femtocell issuing a rejection under cause #12, 13 or 15.

Thus, in this phase of operation, although it is the FBS that performs the recovery action, it performs the action as instructed by the management system.

According to another aspect of the invention, the number of LACs available to the femtocell basestations may be artificially increased by use of virtual mapping techniques.

As mentioned above, the number of LACs available to the femtocell basestation is finite, and this may be further reduced by limitations imposed by the core network. For example, there may be as few as 10 LACs allocated by the network provider to the femtocell network, or to femtocells of a particular category since the LACs allocated to the femtocell network may be pre-allocated to particular categories.

To overcome this problem, the network of femtocell basestations maps each of the LACs allocated by the core network to a higher number of virtual LACs used within the femtocell network. By increasing the number of LACs allocated to the femtocell network, the likelihood of home lock-out is greatly reduced, simply because the probability of the rejecting basestation's LAC being the same as that of the UE's home cell is reduced.

Figure 3:
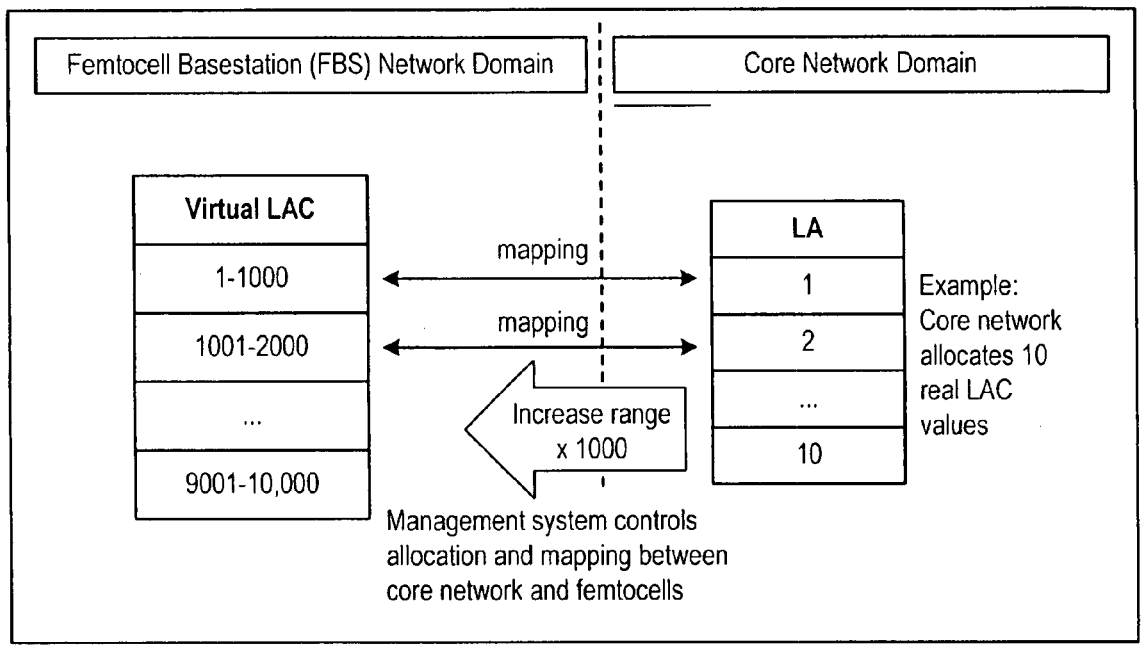
FIG. 3 illustrates a further aspect of the system in accordance with the invention.

FIG. 3 illustrates an example of this concept.

In the example shown, there are 10 LACs allocated in the core network for use in the femtocell network. Each of the 10 LACs is mapped in the management system to a thousand virtual LACs.

The virtual ranges are co-ordinated and pre-assigned by the femtocell management system, using the set of LACs that are not used by the macro network. A typical macro network uses a few hundred LACs in a typical country, and as there are approximately 65,000 LACs in total, there may be up to 64,000 LACs available for use in the virtual ranges.

Thus, once the femtocell is configured to use a virtual LAC, it will broadcast the virtual values on the radio interface (i.e. in communications with UEs), and intercept and translate every signal to and from the core network that carries the original LAC.

Further, according to another embodiment, the femtocell determines whether mapping is necessary by detecting the surrounding RF environment. For example, if there is an adequate macro signal, as has been discussed before, reject loops are less likely to occur. In this case, then, the basestation may determine that it is unnecessary to increase the number of LACs through mapping. Conversely, if the macro signal is poor, mapping may be needed to reduce the risk of home lock-out.

According to a further preferred embodiment, the femtocell basestation determines whether mapping is necessary according to its category as defined above. For example, a "public" femtocell basestation will typically not require mapping, as it is programmed not to reject registration attempts from any UE (and thus home lock-out will not occur).

According to a further embodiment, femtocell basestations in which significant and persistent reject loop activity occurs may be allocated a unique virtual LAC from a reserved list maintained by the management system. As there is only a limited number of LACs, such a list must be strictly controlled and unique LACs allocated only in the worst-case scenario. For example, this solution may be applied to basestations in the "troublespot" category, or even only the worst basestations within that category. By allocating a unique LAC to the basestation, the system overcomes any chance of home lock-out, as the rejecting basestation's LAC cannot possibly then match the UE's home cell LAC.

There are therefore described several methods for overcoming the problems of reject loops and home lock-out in femtocell networks.

The invention claimed is:

1. A method of operation of a basestation in a cellular communications network, the method comprising:
   maintaining a list of user equipments that are authorized to use the basestation;
   in response to a first registration request received from a user equipment that is not authorized to use the basestation:
   starting a timer;
   starting a count of registration requests received from said user equipment that is not authorized to use the basestation; and transmitting a first rejection message to said user equipment that is not authorized to use the basestation, wherein said first rejection message permits the user equipment to make further registration requests to said basestation; and in response to a subsequent registration request received from said user equipment that is not authorized to use the basestation within a first monitoring period after starting the timer:

incrementing said count of registration requests received from said user equipment that is not authorized to use the basestation, the method further comprising, when said count of registration requests received from said user equipment that is not authorized to use the basestation reaches a predetermined threshold within the first monitoring period:

transmitting a second rejection message to said user equipment that is not authorized to use the basestation, wherein said second rejection message prevents the user equipment from making further registration requests to said basestation.

2. A method as claimed in claim 1, wherein said second rejection message causes a location area of said basestation to be identified by the user equipment as forbidden.

3. A method as claimed in claim 1, further comprising:
receiving registration requests from a plurality of user equipments that are unauthorized on said basestation; and
maintaining a second count of the total number of registration requests from said plurality of unauthorized user equipments.

4. A method as claimed in claim 2, further comprising:
receiving registration requests from a plurality of user equipments that are unauthorized on said basestation; and
maintaining a second count of the total number of registration requests from said plurality of unauthorized user equipments.

5. A method as claimed in claim 3, further comprising:
comparing said second count with a second threshold; and
if said second count exceeds said second threshold within a second monitoring period, transmitting a report to a management system of said network.

6. A method as claimed in claim 4, further comprising:
comparing said second count with a second threshold; and
if said second count exceeds said second threshold within a second monitoring period, transmitting a report to a management system of said network.

7. A basestation in a cellular communications network, comprising:
memory, and
one or more processors, the one or more processors configured to:
maintain a list of user equipments that are authorized to use the basestation;
in response to a first registration request received from a user equipment that is not authorized to use the basestation:
start a timer;
start a count of registration requests received from said user equipment that is not authorized to use the basestation; and
transmit a first rejection message to said user equipment that is not authorized to use the basestation, wherein said first rejection message permits the user equipment to make further registration requests to said basestation; and
in response to a subsequent registration request received from said user equipment that is not authorized to use the basestation within a first monitoring period after starting the timer:
increment said count of registration requests received from said user equipment that is not authorized to use the basestation,
the one or more processors further configured to:
when said count of registration requests received from said user equipment that is not authorized to use the basestation reaches a predetermined threshold within the first monitoring period:
transmit a second rejection message to said user equipment that is not authorized to use the basestation, wherein said second rejection message prevents the user equipment from making further registration requests to said basestation.

8. A basestation as claimed in claim 7, wherein said second rejection message causes a location area of said basestation to be identified by the user equipment as forbidden.

9. A basestation as claimed in claim 7, wherein the one or more processors are further configured to:
receive registration requests from a plurality of user equipments that are unauthorized on said basestation; and
maintain a second count of the total number of registration requests from said plurality of unauthorized user equipments.

10. A basestation as claimed in claim 8, wherein the one or more processors are further configured to:
receive registration requests from a plurality of user equipments that are unauthorized on said basestation; and
maintain a second count of the total number of registration requests from said plurality of unauthorized user equipments.

11. A basestation as claimed in claim 9, wherein the one or more processors are further configured to:
compare said second count with a second threshold; and
if said second count exceeds said second threshold within a second monitoring period, transmit a report to a management system of said network.

12. A basestation as claimed in claim 10, wherein the one or more processors are further configured to:
compare said second count with a second threshold; and
if said second count exceeds said second threshold within a second monitoring period, transmit a report to a management system of said network.

* * * * *